F. T. WARD & T. BEDWORTH.
SPIRIT-LEVEL.
No. 191,389.  Patented May 29, 1877.
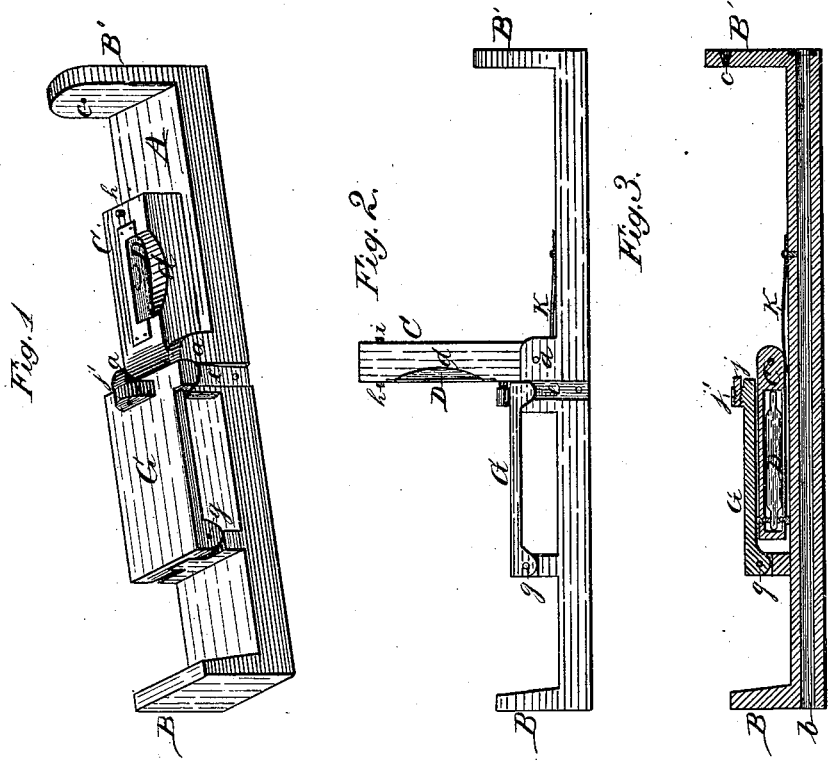
Attest:
E. E. Court
Jno. R. Brooks
Inventor:
F. T. Ward & T. Bedworth,
by C. A. Snow & Co.
Attys.

UNITED STATES PATENT OFFICE.

FREDERICK T. WARD AND THOMAS BEDWORTH, OF MOHAWK, NEW YORK.

IMPROVEMENT IN SPIRIT-LEVELS.

Specification forming part of Letters Patent No. 191,389, dated May 29, 1877; application filed April 21, 1877.

*To all whom it may concern:*

Be it known that we, FREDERICK T. WARD and THOMAS BEDWORTH, of Mohawk, in the county of Herkimer and State of New York, have invented certain new and useful Improvements in Spirit-Levels; and we do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a perspective view. Fig. 2 is a side elevation of the level set for plumbing, and Fig. 3 is a longitudinal vertical section.

Similar letters of reference indicate corresponding parts in all the figures.

This invention relates to an improved spirit-level which may be used with equal advantage for leveling, plumbing, and leveling overhead; and it consists in the construction and combination of parts hereinafter more fully shown and described.

In the drawing, A is the body or "stock" of the level, which, like the rest of its parts, I prefer to make of cast-iron. It is perforated longitudinally, as shown at $b$, so as to form a "sight," the detailed construction of which, however, I do not claim.

At each end of the stock is a bracket, B B', one of which is somewhat higher than the other, and has a minute perforation, $c$, serving as an additional sight, which, in some cases, is more convenient, as it is farther from the wall against which the level has to be placed for sighting.

The spirit-level is contained in a block or casing, C, which is hinged, near the middle of stock A, between two ears or brackets, $a$ $a$. The casing C is open on top, so as to expose the glass D to view, and its sides are cut away, as shown at $d$, so as to expose the level-glass, (when leveling overhead.)

A spring, K, is secured upon stock A, under casing C, so as to retain it in any desired position.

G is a covering-plate, hinged to stock A at $g$. The object of this is partly to protect the level-glass from injury when not in use, when it is folded as shown in Fig. 3, partly to serve as a rest for the casing C, when the level is used for plumbing, as hereinafter described.

A spring-latch, $e$, arranged in the side of one of the brackets $a$, serves to keep the cover in position.

In order to keep the level true when leveling, plumbing, or leveling overhead, I employ three set-screws, arranged one in the upper and one in the under side of casing C, at the end thereof, ($h$ and $i$ respectively,) and the third one, $j$, in a lug, $j'$, upon the end of covering-plate G, or in the end of the plate itself.

When leveling, the casing C is turned from under covering-plate G to the position shown in Fig. 1, where it is kept true by the set-screw $i$, upon which the casing rests, and which has been previously adjusted.

For plumbing, it is only necessary to turn casing C to the position shown in Fig. 2, where it rests upon the set-screw $j$ of plate G, which keeps it at right angles to the stock A.

When the device is to be used for leveling overhead, the casing C is turned in under cover G, as shown in Fig. 3, thus exposing the glass to view through the slots or cuts $d$, and keeping it true by set-screw $h$ resting against stock A.

Having thus described our invention, we claim and desire to secure by Letters Patent of the United States—

1. The combination of the stock A, hinged casing C having level-glass D, and hinged covering-plate G, substantially as and for the purpose set forth.

2. In a spirit-level, the combination of the hinged casing C having level-glass D, with the covering-plate G having set-screw $j$, substantially as and for the purpose shown and specified.

3. The improved spirit-level and plumb herein described, consisting of stock A having brackets B B', hinged casing C having level-glass D, and set-screws $h$ $i$, hinged covering-plate G having set-screw $j$, and latch $e$, all combined and arranged to operate substantially in the manner and for the purpose herein shown and specified.

In testimony that we claim the foregoing as our own we affix our signatures in presence of two witnesses.

FREDERICK T. WARD.
THOMAS BEDWORTH.

Witnesses:
WILLIAM HELMES,
FERGUS TRUMAN.